(12) United States Patent
Sironi et al.

(10) Patent No.: US 6,706,112 B2
(45) Date of Patent: Mar. 16, 2004

(54) ADDITIVES BASED ON HYDROXYALKYL GUAR DERIVATIVES FOR USE IN MORTARS AND MORTARS INCLUDING THEM

(75) Inventors: Enrico Sironi, Paderno Dugnano (IT); Giampietro Margheritis, Caravate (IT); Ugo Claudio Pfeiffer, Milan (IT); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 0 days.

(21) Appl. No.: 10/161,246

(22) Filed: Jun. 3, 2002

(65) Prior Publication Data

US 2003/0221592 A1 Dec. 4, 2003

(30) Foreign Application Priority Data

Jun. 4, 2001 (IT) ...................................... VA2001A0015

(51) Int. Cl.$^7$ ........................... C04B 24/00; C04B 24/10
(52) U.S. Cl. ..................... 106/730; 106/804; 106/805; 106/823; 536/114
(58) Field of Search ................................. 106/730, 804, 106/805, 823; 536/114

(56) References Cited

U.S. PATENT DOCUMENTS

| | | | |
|---|---|---|---|
| 4,065,319 A | 12/1977 | Desmarais | 106/93 |
| 4,402,752 A | 9/1983 | Chesney, Jr. | 106/93 |
| 4,487,864 A | 12/1984 | Bermudez et al. | 524/2 |
| 4,501,617 A | 2/1985 | Desmarais | 106/93 |
| 4,525,500 A | 6/1985 | Lynn | 524/5 |
| 4,645,812 A * | 2/1987 | Maier | 526/200 |
| 4,846,889 A | 7/1989 | Meyer | 106/115 |
| 4,939,192 A | 7/1990 | t'Sas | 524/44 |
| 5,366,550 A | 11/1994 | Schad | 106/730 |
| 5,432,215 A | 7/1995 | Girg et al. | 524/28 |
| 5,575,840 A | 11/1996 | DeWacker | 106/162.81 |
| 5,753,036 A | 5/1998 | Hornaman et al. | 106/810 |

OTHER PUBLICATIONS

"Industrial Gums", Polysaccharides and Their Derivatives, Third Edition, pp. 188–189 (1983).*

* cited by examiner

*Primary Examiner*—Elizabeth D. Wood
(74) *Attorney, Agent, or Firm*—Madan, Mossman & Sriram, P.C.

(57) ABSTRACT

Disclosed are cementitious mortar additives comprising a hydroxyalkyl guar derivative having a molar substitution of from about 0.7 to about 3. Also disclosed are dry cementitious mortar compositions including from 0.1 to 1.5% by weight of the additive and cured cementitious mortars obtained by addition of water to the dry cementitious mortar compositions.

8 Claims, No Drawings

ADDITIVES BASED ON HYDROXYALKYL GUAR DERIVATIVES FOR USE IN MORTARS AND MORTARS INCLUDING THEM

BACKGROUND OF THE INVENTION

1. Field of the Invention

The present invention relates to cementitious mortars. The present invention particularly relates to cementitious mortars including additives that improve processing.

2. Description of the Prior Art

It is well known to use cementitious mortars as adhesives or jointing compositions in the building industry, particularly to adhere tiles or ceramics in general, vertically or horizontally, to plane surfaces of different kinds, such as to concrete, plywood or brick surfaces. Such cementitious mortars generally consist of cement mixed with a variable amount of sand. Immediately prior to use, a proper amount of water is added to the mixture, making it workable and allowing the spreading of thin strata of mortar on the back side of the tile or object that is to be applied.

The curing of such a mortar, also commonly referred to as "setting" begins as soon as the mortar is admixed with water and will result in its complete hardening and its exhibiting those physical and mechanical features that allow the stable and lasting adhesion of the tile to the surface to which it is applied. Setting is a rather complex chemical process that leads to polymeric inorganic structures whose strong reciprocal interactions result in the formation of solid and strong masses and in the above said macroscopic effects. The hardening of the mortar permits its strong adhesion both to the tile and to the underlying surface.

In the setting process, many features are of importance and influence not only the speed at which setting occurs but also its final effectiveness, i.e. its solidity. Among these features of fundamental importance are the content of water and the capability of the composition to retain the proper amount of water during the whole setting process. It is important that the mortar retain sufficient water until all the desired physical characteristics are obtained.

There are several potential problems experienced by those installing tile using mortar. In practice, all the surfaces to which tiles are generally applied are porous and absorbent. As such, and the porous and absorbent surfaces absorb water from the mortar in the area of contact, thus creating defects in the setting which may at some point in time result in the separation of the tile from the surface to which it is attached.

Another problem encountered by tile installers is a too rapid hardening of the mortar that prevents the adjustment of the tiles during their laying. This problem is called "lack of open time" and/or "lack of adjustability time".

Yet another problem encountered by tile installers occurs when the content of water becomes excessive, even if only locally or because of a lack of homogeneity of mixing. In such cases, setting becomes too slow due to a too flowing mixture. If this occurs, then the tile tends to slip down, dragged down by its own weight, and the resulting application becomes imprecise and difficult and working time grows longer.

Another issue in the handling of mortar is the fact that water in the mortar mixture acts as a lubricant for the solid particles when mortar is spread on the surface of the object to which it is to be applied. The proper amount of water gives to the mixture the "pastiness" or "creaminess" suitable for a uniform, homogeneous and easy laying. The Theological characteristics of the final mixture are very important and they depend on the kind and on the amount of the different components in the mixture.

The rheology of a mixture of sand, cement, and water is not suitable for use as a mortar because of the lack of the above-mentioned characteristics, and more generally, because of its poor processing. To overcome these problems additives are used in the formulation of mortars acting as retention aids and rheology modifiers. These additives are generally synthetic or semi-synthetic polymers, usually chemically modified natural polymers, exhibiting the specific characteristic of bonding and coordinating a large amount of water once they are dissolved in water.

These products, and among these in particular cellulose ethers, are highly purified products whose preparation requires many sophisticated and complex purification steps. They are rather expensive products.

In literature many mixtures are described for use in cementitious mortars, such as in U.S. Pat. Nos. 4,501,617; 5,366,550; 4,065,319; 5,575,840; 4,939,192; 5,753,036; 4,525,500; 4,402,752; 4,846,889; 5,432,215; and U.S. Pat. No. 4,487,864; wherein mixtures are also described whose components show synergic effects. In particular, in U.S. Pat. No. 4,487,864 and in U.S. Pat. No. 5,432,215; guar derivatives are cited among the natural products capable of increasing the viscosity of cementitious mortar, but it is taught to use them in combination with other rheology modifiers to reach the desired levels of viscosity and water retention.

It would be desirable in the art of preparing mortars for attaching tiles to prepare such mortars using additives that improve the processing of such mortars. It would be particularly desirable to use such additives that are low in cost and provide for other advantages over conventional additives.

SUMMARY OF THE INVENTION

In one aspect, the present invention is a cementitious mortar additive including a hydroxyalkyl guar derivative having a molar substitution of from about 0.7 to about 3.

In another aspect, the present invention is a dry cementitious mortar composition including a hydroxyalkyl guar additive having a molar substitution of from about 0.7 to about 3.

In yet another aspect, the present invention is a cementitious mortar prepared by admixing a dry cementitious mortar including a hydroxyalkyl guar mortar additive having a molar substitution of from about 0.7 to about 3, and an amount of water of from about 10 to about 45 parts by weight for 100 parts by weight of dry cementitious mortar composition.

DETAILED DESCRIPTION OF THE PREFERRED EMBODIMENTS

The hydroxyalkyl guar derivatives are semi-synthetic derivatives, which due to their low production cost are desirable as replacements for other products now in use. Guar, or guar gum, is a polysaccharide belonging to the family of galactomannans and is extracted from a leguminosae, "Cyamopsis Tetragonolobus", that grows in the semi-dry region of tropical countries, particularly in India and in Pakistan. Its hydroxyethyl and hydroxypropyl derivatives (respectively HEG and HPG) are commonly employed in the textile industry as printing paste thickeners, in the paints and coatings industry as rheology modifiers, in the drilling industry, in paper and explosives production and in other industry sectors (Industrial Gums 3rd Ed., 1993, Academic Press Inc., pp 199–205).

The polysaccharidic molecule of guar consists of a main linear chain of poly-mannose bearing branches of galactose units in a molar ratio of about 2:1. The products commercially available generally have a molar substitution equal or less than 0.4 and a molecular weight normally of from about 200,000 to about 500,000 daltons. For the purposes of the present invention, molar substitution, that is the average number of moles of alkylating agent added per monosaccharidic unit, is abbreviated "MS."

The most common substituent groups of conventional guar derivates are the 2-hydroxyethyl and the 2-hydroxypropyl groups that are respectively obtained by the reaction with ethylene oxide and propylene oxide. Such traditional guar derivatives do not possess the proper characteristics to formulate a composition for use in cementitious mortars. Evidences of their unsuitability have also been pointed out by well known laboratory tests, by comparing said products with the commonly used cellulose ethers.

The main critical characteristic of a cementitious mortar is its adhesion strength. More specifically, the initial adhesion of cementitious compositions including hydroxyalkyl guar derivatives with a molar substitution equal or smaller than 0.4, measured according to EN standard 1348, is 30–50% lower than similar cementitious compositions including cellulose ethers additives commonly used in such formulations.

Many attempts have been made to positively modify the characteristics of guar derivatives and to make them suitable for use in cementitious mortars. Surprisingly, it has now been determined that hydroxyalkyl guar derivatives characterized by a molar substitution greater than 0.7 are particularly suitable as additives for cementitious mortars, being able to impart them an initial adhesion as good as the adhesion of mortars including cellulose ether additives. A further relevant advantage of the guar derivatives of the present invention is the fact that, surprisingly, they can be used in crude form as they guarantee good performances without the need of a purification step after their preparation, and, as a consequence, they are obtainable at substantially a lower factory cost.

In one aspect, the present invention is a cementitious mortar additive including one or more hydroxyalkyl guar derivatives having a molar substitution of from 0.7 to 3.0. Any such hydroxyalkyl guar derivative having a molar substitution range of from 0.7 to 3.0 can be used with the present invention. The preferred hydroxyalkyl guar derivatives useful with the present invention are hydroxypropyl guar, hydroxyethyl guar and hydroxyethyl hydroxypropyl guar. Mixtures of these may also be used with the present invention. The additives of the present invention may additionally contain from 0 to 80% by weight of a cellulose ether.

While the hydroxyalkyl guar derivatives having a molar substitution equal or smaller than 0.4, even when used in combination with cellulose ethers, do not exhibit the desirable performances, a further surprising advantage of the hydroxyalkyl guar derivatives of the present invention is that they can be used in combination with the cellulose ethers in any ratio, up to 80%, without altering their properties. Examples of cellulose ethers useful with the present invention are methyl cellulose, hydroxyethyl cellulose, hydroxypropyl cellulose, hydroxypropylmethyl cellulose, ethylhydroxyethyl cellulose, hydroxybutylmethyl cellulose, and hydroxyethylhydroxypropyl cellulose. Mixtures of these may also be used.

In another aspect this invention is a dry cementitious composition including from about 30% to 80% by weight of sand, from about 30% to about 80% of cement, from 0 to about 7% by weight of a polymeric organic binder and from about 0.1 to about 1.5% by weight, preferably from about 0.1 to about 0.8%, of an additive essentially consisting of one or more hydroxyalkyl guar derivative having a molar substitution of from about 0.7 to about 3. A particularly preferred composition is one wherein the additive contains at least a cellulose ether and at least a hydroxyalkyl guar derivative in a weight ratio of from about 2:1 to about 4:1.

Preferably the dry cementitious composition of the present invention contain from about 1 to about 7% by weight of a polymeric organic binder. Examples of utilizable polymeric organic binders are vinyl polymers and copolymers in the form of dispersible powder, such as vinyl acetate-ethylene copolymers. The cementitious mortar of the present invention may additionally contain one or more accelerators, such as calcium formate.

The use of hydroxyalkyl guar derivatives having an MS less than or equal to 0.4 in many kind of building compositions is known, but use of such derivates do not result in mortars having the physical properties desirable for use in applications such as laying tiles.

The ideal additive for cementitious tile mortar may exhibit the following characteristics:

an initial adhesion greater than 0.5 N/mm2;

a percentage of coverage greater than 30% after 10 minutes; and an adjustability time equal to or greater than 10 minutes.

Surprisingly, the hydroxyalkyl guar derivatives of the present Invention having a high molar substitution, even though they do not need a purification step and are obtainable with a much lower factory cost than the one of the cellulose ethers commonly employed, can Impart to cementitious mortars all the above-mentioned characteristics.

The cementitious mortars of the present invention are prepared from a dry composition of sand, cement, hydroxyalkyl guar derivative and, optionally, polymeric organic binder, by adding gradually this composition to water and mixing. The correct amount of water is one that makes it possible to obtain the cementitious mortar in the form of a slurry possessing a good workability and uniformly spreadable on the surface where the tile is to be installed. Normally this amount ranges from about 10 to about 45, preferably from about 20 to about 35, parts by weight of water per 100 parts by weight of dry composition.

EXAMPLES

The following examples are provided to illustrate the present invention. The examples are not intended to limit the scope of the present invention and they should not be so interpreted. Amounts are in weight parts or weight percentages unless otherwise indicated.

In the examples, the initial adhesion is measured according to EN standard 1348, using both porous (Faenza) and non absorbent (gres) tiles.

The percentage of coverage is determined by the following method. The cementitious mortar is prepared manually and allowed to stand for about 5 minutes. The cementitious mortar is mixed for 15–20 seconds before application. The cementitious mortar is then applied to a surface of concrete bricks by means of a trowel. After 5 minutes and after 10 minutes from the application a 50×50×8 mm porous ceramic tile with a minimum water absorbance of 12% and smooth on both sides is laid down; a 2 Kg weight is then applied to the tile for thirty seconds. The tile is pulled off and the area of the tile covered with mortar is measured by means of a calliper. The result of test is reported as percentage of coverage and is related to the time elapsed from the application of the mortar. A high percentage of coverage is indicative of a good affinity of the mortar with the tile.

The adjustability time is determined as follows. The cementitious mortar is prepared manually and allowed to stand for about 5 minutes. The cementitious mortar is mixed for 15–20 seconds before application. The cementitious mortar is then applied to a surface of concrete bricks by means of a trowel and allowed to stand for 2 minutes. Three 50×50×8 mm porous ceramic tiles with a minimum water absorbance of 12% and smooth on both sides are laid down spacing them out of at least 5 cm. A 2 Kg weight is then applied to the tiles for thirty seconds. After 5, 10 and 15 minutes from the application of mortar one of the tiles is manually rotated of 90 degrees, verifying whether this causes its detachment or not. The adjustability time is reported in minutes and it corresponds to the maximum time at which it is possible to rotate the tile without its detachment from the mortar.

Example 1

A dry cementitious mortar composition (Composition A) is prepared combining:
Silica sand (0–0.5 mm) 57.3 (parts by weight);
Portland Cement I 42.5 R 38.2 (parts by weight);
Calcium formate 0.5 (parts by weight); and
Vinnapas® RE 5010(1) 4.0 (parts by weight)
(1) a vinyl acetate-ethylene copolymer available from Wacker.

Using Composition A, ten cementitious mortars are prepared whose compositions are reported in Table 1. 0.4% by weight of a rheology modifier is added to Composition A and the admixture homogenised. 100 parts by weight of the dry composition are then slowly admixed with 20 parts by weight of water and the admixture is manually stirred until a slurry with a uniform consistency is formed. To improve the cementitious mortar workability, additional water is added, taking care that slip, measured according to EN standard 1308, does not exceed 5 mm.

TABLE 1

| Cementitious Mortar | Chemical nature of the rheology modifier | Parts by weight of water per 100 parts by weight of dry composition |
|---|---|---|
| A1 | Methyl hydroxypropyl cellulose[1] | 21 |
| A2 | Methyl hydroxyethyl cellulose[2] | 21 |
| A3 | Hydroxyethyl guar M.S. 0.25 | 24 |
| A4 | Hydroxypropyl guar M.S. 0.24 | 22 |
| A5 | Hydroxypropyl guar M.S. 0.4 | 22 |
| A6 | Hydroxypropyl guar M.S. 0.9 | 21 |
| A7 | Depolymerized Hydroxypropyl guar M.S. 1.1 | 20 |
| A8 | Hydroxypropyl guar M.S. 1.1 | 21 |
| A9 | Hydroxypropyl guar M.S. 1.3 | 21 |
| A10 | Hydroxypropyl Hydroxyethyl guar M.S. 1.3 | 21 |

[1]Culminal ® 40000 (Aqualon)
[2]Culminal ® Pff 15000 (Aqualon)

The cementitious mortars of Table 1 are tested by measuring their initial adhesion on porous (Faenza) and non absorbent (gres) tiles, according to the above-described procedure. The results are summarized in Table 2.

TABLE 2

|  | A1 | A2 | A3 | A4 | A5 | A6 | A7 | A8 | A9 | A10 |
|---|---|---|---|---|---|---|---|---|---|---|
| Initial adhesion on Faenza tile (N/mm$^2$) | 1.17 | 1.58 | 0.78 | 0.53 | 0.31 | 1.51 | 1.45 | 2.03 | 2.21 | 1.96 |
| Initial adhesion on gres tile (N/mm$^2$) | 1.12 | 1.39 | 0.33 | 0.39 | 0.69 | 1.18 | 1.72 | 1.67 | 1.75 | 1.61 |

Example 2

A dry cementitious mortar composition (Composition B) is prepared combining:

Silica sand (0–0.5 mm) 58.5 (parts by weight);
Portland Cement I 42.5 R 39.0 (parts by weight);
Calcium formate 0.5 (parts by weight); and
Vinnapas® RE 5010(1) 2.0 (parts by weight).

(1) a vinylacetate-ethylene copolymer available from Wacker.

Using Composition B, ten cementitious mortars are prepared whose compositions are reported in Table 3. 0.4% by weight of a rheology modifier is added to Composition B and homogenised. 100 parts by weight of the dry composition are then slowly admixed with 20 parts by weight of water and the admixture is manually stirred until a slurry with a uniform consistency is formed. To improve the cementitious mortar workability, additional water is added, taking care that slip, measured according to EN standard 1308, does not exceed 5 mm.

TABLE 3

| Cementitious Mortar | Chemical nature of the rheology modifier | Parts by weight of water per 100 parts by weight of dry composition |
|---|---|---|
| B1 | Methyl hydroxypropyl cellulose[(1)] | 22 |
| B2 | Methyl hydroxyethyl cellulose[(2)] | 23 |
| B3 | Hydroxyethyl guar M.S. 0.25 | 26 |
| B4 | Hydroxypropyl guar M.S. 0.24 | 26 |
| B5 | Hydroxypropyl guar M.S. 0.4 | 25 |
| B6 | Hydroxypropyl guar M.S. 0.9 | 24 |
| B7 | Depolymerized Hydroxypropyl guar M.S. 1.1 | 23 |
| B8 | Hydroxypropyl guar M.S. 1.1 | 24 |
| B9 | Hydroxypropyl guar M.S. 1.3 | 23 |
| B10 | Hydroxypropyl Hydroxyethyl guar M.S. 1.3 | 23 |

[(1)]Culminal ® 40000 (Aqualon)
[(2)]Culminal ® Pff 15000 (Aqualon)

The cementitious mortars of Table 3 are tested by measuring their initial adhesion on porous (Faenza) and non absorbent (gres) tiles, according to the above-mentioned standard. The percentage of coverage and the adjustability time are measured according to the above-described methods. The results are summarized in Table 4.

TABLE 4

|  | B1 | B2 | B3 | B4 | B5 | B6 | B7 | B8 | B9 | B10 |
|---|---|---|---|---|---|---|---|---|---|---|
| Initial adhesion on Faenza tile (N/mm$^2$) | 1.37 | 1.35 | 0.60 | 0.61 | 0.22 | 1.41 | 1.64 | 1.18 | 1.22 | 1.86 |
| Initial adhesion on gres tile (N/mm$^2$) | 1.21 | 1.23 | 0.22 | 0.28 | 0.34 | 1.11 | 1.81 | 1.26 | 1.11 | 1.41 |
| Percentage of coverage at 5' | 85 | 98 | 50 | 0 | 0 | 98 | 98 | 98 | 95 | 98 |
| Percentage of coverage at 10' | 30 | 82 | 48 | — | — | 77 | 90 | 98 | 85 | 95 |
| Adjustability time in minutes | 15 | 15 | 10 | 5 | 5 | 15 | 10 | 10 | 10 | 10 |

Example 3

A dry cementitious mortar composition (Composition C) is prepared by combining:

Silica Sand (0–0.5 mm) 59.7 (parts by weight);
Portland Cement I 42.5 R 39.8 (parts by weight); and
Calcium Formate 0.5 (parts by weight).

Using Composition C, ten cementitious mortars are prepared whose compositions are reported in Table 5. 0.4% by weight of a rheology modifier is added to Composition C and homogenised. 100 parts by weight of the dry composition are then slowly admixed with 20 parts by weight of water and the admixture is manually stirred until a slurry with a uniform consistency is formed. To improve the cementitious mortar workability, additional water is added, taking care that slip, measured according to EN standard 1308, does not exceed 5 mm.

TABLE 5

| Cementitious Mortar | Chemical nature of the rheology modifier | Parts by weight of water per 100 parts by weight of dry composition |
|---|---|---|
| C1 | Methyl hydroxypropyl cellulose[(1)] | 22 |
| C2 | Methyl hydroxyethyl cellulose[(2)] | 22 |
| C3 | Hydroxyethyl guar M.S. 0.25 | 27 |
| C4 | Hydroxypropyl guar M.S. 0.24 | 27 |
| C5 | Hydroxypropyl guar M.S. 0.4 | 27 |
| C6 | Hydroxypropyl guar M.S. 0.9 | 24 |
| C7 | Depolymerized Hydroxypropyl guar M.S. 1.1 | 23 |
| C8 | Hydroxypropyl guar M.S. 1.1 | 24 |
| C9 | Hydroxypropyl guar M.S. 1.3 | 24 |

TABLE 5-continued

| Cementitious Mortar | Chemical nature of the rheology modifier | Parts by weight of water per 100 parts by weight of dry composition |
|---|---|---|
| C10 | Hydroxypropyl Hydroxyethyl guar M.S. 1.3 | 23 |

(1)Culminal ® 40000 (Aqualon)
(2)Culminal ® Pff 15000 (Aqualon)

The cementitious mortars of Table 5 are tested by measuring their initial adhesion on porous (Faenza) and non absorbent (gres) tiles, according to the above-mentioned standard. The percentage of coverage and the adjustability time are measured according to the above-described methods. The results are summarized in Table 6.

TABLE 6

|  | C1 | C2 | C3 | C4 | C5 | C6 | C7 | C8 | C9 | C10 |
|---|---|---|---|---|---|---|---|---|---|---|
| Initial adhesion on Faenza tile (N/mm²) | 0.57 | 0.85 | 0.15 | 0.14 | n.a. | 0.68 | 0.69 | 0.85 | 0.78 | 0.72 |
| Initial adhesion on gres tile (N/mm²) | 0.79 | 0.76 | 0.01 | 0.00 | 0.00 | 0.40 | 0.60 | 0.82 | 0.66 | 0.55 |
| Percentage of coverage at 5' | 85 | 100 | 0 | 0 | 0 | 89 | 98 | 90 | 98 | 100 |
| Percentage of coverage at 10' | 35 | 50 | — | — | — | 38 | 43 | 82 | 98 | 65 |
| Adjustability time in minutes | 15 | 15 | <5 | <5 | <5 | 10 | 10 | 10 | 15 | 5 |

Example 4

A dry cementitious mortar composition (Composition D) is prepared by combining:

Silica Sand (0–0.5 mm) 70 (parts by weight); and
Portland Cement I 42.5 R 30 (parts by weight).

Using Composition D, five cementitious mortars are prepared whose compositions are reported in Table 7. 0.3% by weight of a rheology modifier is added to Composition C and homogenised. 100 parts by weight of the dry composition are then slowly admixed with 20 parts by weight of water and the admixture is manually stirred until a slurry with a uniform consistency is formed. To improve the cementitious mortar workability, additional water is added, taking care that slip, measured according to EN standard 1308, does not exceed 5 mm.

TABLE 7

| Cementitious Mortar | Composition of the Rheology modifier | Parts by weight of water per 100 parts by weight of dry composition |
|---|---|---|
| D1 | Modified methyl cellulose(1) | 25 |
| D2 | Modified methyl cellulose(1) (4 parts by weight) Hydroxypropyl guar M.S. 1.3 (1 part by weight) | 24 |
| D3 | Modified methyl cellulose(1) (2 parts by weight) Hydroxypropyl guar M.S. 1.3 (1 part by weight) | 24 |
| D4 | Modified methyl cellulose(1) (1 part by weight) Hydroxypropyl guar M.S. 1.3 (1 part by weight) | 24 |
| D5 | Modified methyl cellulose(1) (1 part by weight) Hydroxypropyl guar M.S. 1.3 (2.3 parts by weight) | 24 |

(1)Culminal ® 9115 (Aqualon)

The cementitious mortars of Table 7 are tested by measuring their initial adhesion on porous (Faenza) and non absorbent (gres) tiles, according to the above-mentioned standard. The percentage of coverage and the adjustability time are measured according to the above-described methods. The results are summarized in Table 8.

TABLE 8

|  | D1 | D2 | D3 | D4 | D5 |
|---|---|---|---|---|---|
| Initial adhesion on Faenza tile (N/mm²) | 0.63 | 0.55 | 0.61 | 0.64 | 0.39 |
| Initial adhesion on gres tile (N/mm²) | 0.74 | 0.71 | 0.60 | 0.91 | 0.64 |
| Percentage of coverage at 5' | 95 | 98 | 98 | 100 | 98 |
| Percentage of coverage at 10' | 90 | 62 | 97 | 95 | 75 |
| Adjustability time in minutes | 15 | 15 | 15 | 15 | 15 |

We claim:

1. A dry cementitious mortar composition comprising from about 30 to about 80% by weight of sand, from about 30 to about 80% by weight of cement, and from about 0.1 to about 1.5% by weight of a hydroxyalkyl guar derivative having a molar substitution of from about 0.7 to about 3.

2. The dry cementitious mortar composition of claim 1 wherein the hydroxyalkyl guar derivative is selected from the group consisting of hydroxypropyl guar, hydroxyethyl guar, hydroxyethylhydroxypropyl guar, and mixtures thereof.

3. The dry cementitious mortar composition of claim 1 wherein the dry cementitious mortar composition contains from about 0.1 to about 0.8% by weight of the hydroxyalkyl guar derivative.

4. The dry cementitious mortar composition of claim 1 wherein the dry cementitious mortar composition contains from about 1 to about 7% by weight of a polymeric organic polymer.

5. The dry cementitious mortar composition of claim 1 wherein the hydroxyalkyl guar derivative includes at least one cellulose ether and at least one hydroxyalkyl guar derivative having a molar substitution of from about 0.7 to about 3 in a weight ratio of from about 2:1 to about 4:1.

6. The dry cementitious mortar composition of claim 5 wherein the cellulose ether is selected from the group consisting of methyl cellulose, hydroxyethyl cellulose, hydroxypropyl cellulose, hydroxypropylmethyl cellulose, ethylhydroxyethyl cellulose, hydroxybutylmethyl cellulose, hydroxyethylhydroxypropyl cellulose, and mixtures thereof.

7. A cementitious mortar prepared by admixing a dry cementitious mortar composition of claim 1 and an amount of water of from about 10 to about 45 parts by weight for 100 parts by weight of the dry cementitious mortar composition, and allowing the mortar to cure.

8. The cementitious mortar of claim 7 wherein the amount of water is from about 20 to about 35 parts by weight for 100 parts by weight of dry composition.

* * * * *